United States Patent [19]

Harrison et al.

[11] Patent Number: 4,490,635
[45] Date of Patent: Dec. 25, 1984

[54] PURE TORQUE, LIMITED DISPLACEMENT TRANSDUCER

[75] Inventors: Joel N. Harrison, Campbell; Donald V. Daniels, Santa Cruz; David A. Brown, Saratoga, all of Calif.

[73] Assignee: Quantum Corporation, Milpitas, Calif.

[21] Appl. No.: 442,129

[22] Filed: Nov. 16, 1982

Related U.S. Application Data

[62] Division of Ser. No. 190,198, Sep. 24, 1980, Pat. No. 4,396,959.

[51] Int. Cl.³ .................. H02K 33/00; G11B 21/08
[52] U.S. Cl. ............................. 310/38; 310/156; 310/268; 360/78; 360/106
[58] Field of Search .............. 310/36, 38, 39, 156, 310/268; 360/77, 78, 106

[56] References Cited

U.S. PATENT DOCUMENTS

| | | | |
|---|---|---|---|
| 3,993,920 | 11/1976 | Sato | 310/66 |
| 4,024,552 | 5/1977 | Kondo | 354/234 |
| 4,203,048 | 5/1980 | Sato | 310/268 |
| 4,315,178 | 2/1982 | Ban | 310/268 X |
| 4,318,145 | 3/1982 | Frandsen | 360/106 |
| 4,329,604 | 5/1982 | Dunstan et al. | 310/268 X |
| 4,361,776 | 11/1982 | Hayashi | 310/268 |
| 4,396,959 | 8/1983 | Harrison et al. | 360/77 |
| 4,408,858 | 10/1983 | Lee | 310/268 X |
| 4,418,370 | 11/1983 | Harrison | 360/106 |

FOREIGN PATENT DOCUMENTS 2029051A 3/1980 United Kingdom.

OTHER PUBLICATIONS

Morgenthaler, M. P. and Weber, Lynn, "Servo-Controlled Beam Director Provides Major Benefits", *Hewlett-Packard Journal*, Feb. 1980, pp. 24–28.

Stickel, "New 50-Megabyte Disc Drive: High Performance and Reliability from High Technology Design", *Hewlett-Packard Journal*, Aug. 1977, pp. 2–15.

*Primary Examiner*—Mark O. Budd
*Attorney, Agent, or Firm*—David B. Harrison

[57] ABSTRACT

A bidirectional, pure torque generating electromechanical rotor mounted to a frame includes flux return top and base plates, a generally annular permanent magnet secured to one of the plates and a generally annular rotatable coil assembly placed between the permanent magnet and the other of the plates.

7 Claims, 5 Drawing Figures

PURE TORQUE, LIMITED DISPLACEMENT TRANSDUCER

This application is a division of U.S. Pat. application No. 190,198 filed on Sept. 24, 1980, now U.S. Pat. No. 4,396,959.

BACKGROUND OF THE INVENTION

This invention relates to a rotary actuator. More particularly, this invention relates to a rotary actuator for generating pure torque for moving e.g. a memory data device member such as a data transducer assembly relative to another member such as a concentric track of a rotating data storage disk.

There are two generally known prior art approaches for moving e.g. a data transducer relative to a rotating storage surface such as a storage disk. One prior art approach was to use a linear moving coil electromagnetic actuator, such as illustrated in U.S. Pat. No. 3,737,883 and used in the Hewlett-Packard Model 79Z0A disk drive product, as described in the *Hewlett-Packard Journal* Aug. 1977, pp. 2-15. The other prior art approach is to use a linear band drive actuator driven by a stepping motor as in the Shugart Associates Model SA1000 disk drive product, as described in a Shugart Associates two page product bulletin dated Sept. 1979 and entitled "8-Inch Fixed Disk Drive", and as further described in co-inventor Joel N. Harrison's prior U.S. Pat. No. 4,418,370.

Rotary actuators have been known and used in various instruments. One such actuator, using a printed circuit rotor segment, is depicted in FIG. 4 of an article entitled "Servo-Controlled Beam Director Provides Major Benefits" published in the *Hewlett-Packard Journal,* Feb. 1980, pages 24-28. While the printed circuit motor illustrated therein operates to rotate a mirror, it does not apply pure (balanced) torque to the mirror shaft.

SUMMARY OF THE INVENTION

One object of the present invention is to provide a novel rotary actuator for positioning one member such as a data transducer relative to another member, such as a rotating data storage medium.

Another object of the present invention is to provide a lightweight, substantially linear, pure torque generator for rapidly moving e.g. a data transducer radially across data tracks of a storage disk during track seeking operations and to maintain the transducer on track during data read and write operations.

A further object of the present invention is to provide an improved, yet simplified high speed and pure torque generator for positioning one member radially relative to another.

One more object of the present invention is to combine readily available and inexpensive electrical and mechanical components in a unique way to provide an improved rotary actuator which occupies a small physical space, which requires only a modest power supply, which is inexpensive to manufacture and which operates reliably over a long useful life.

These and other objects of the present invention are obtained in a bidirectional, pure torque generating electromechanical rotor (rotary actuator) which is rotably mounted to a frame and which rotatingly moves a member relative to the frame over a locus defining a sector of a circle, which is less than 90 degrees. The rotor comprises a flux return base plate, and a flux return top plate. A generally annular permanent magnet is secured to one of the base and top plates, and it is characterized by an even number pluarality of adjacently opposed field magnetic segments in which the north and south poles alternate at the major surfaces thereof. A generally annular, rotatable coil assembly is placed between and is closely spaced from, the permanent magnet and the other of the base and top plates. The coil assembly contains the same even number plurality of coils as there are magnet segments in the permanent magnet. The coils are aligned adjacent to the magnetic segments at at least one position of rotation of the assembly. The coils are connected into two series of opposed windings equidistantly and symmetrically located about the assembly.

A moving member is attached to the assembly and rotatably passes through at least one of the base plate and top plate. The member is rotated along the locus by passage of current through one of the coil series. Torque from the coils is applied evenly to the moving member about its axis of rotation.

A data transducer carriage is mounted to the moving member and has a data transducer secured to its distal end. A counterweight oppositely mounted to the moving member counterbalances the weight of the data transducer carriage, whereby energizing the coils causes pure torque to be applied to the carriage.

Other object, advantages and features of the invention will be apparent to those skilled in the art from a consideration of the following detailed description of a preferred embodiment, presented in conjunction with the accompanying drawings.

DESCRIPTION OF A PREFERRED EMBODIMENT

Figure 1:
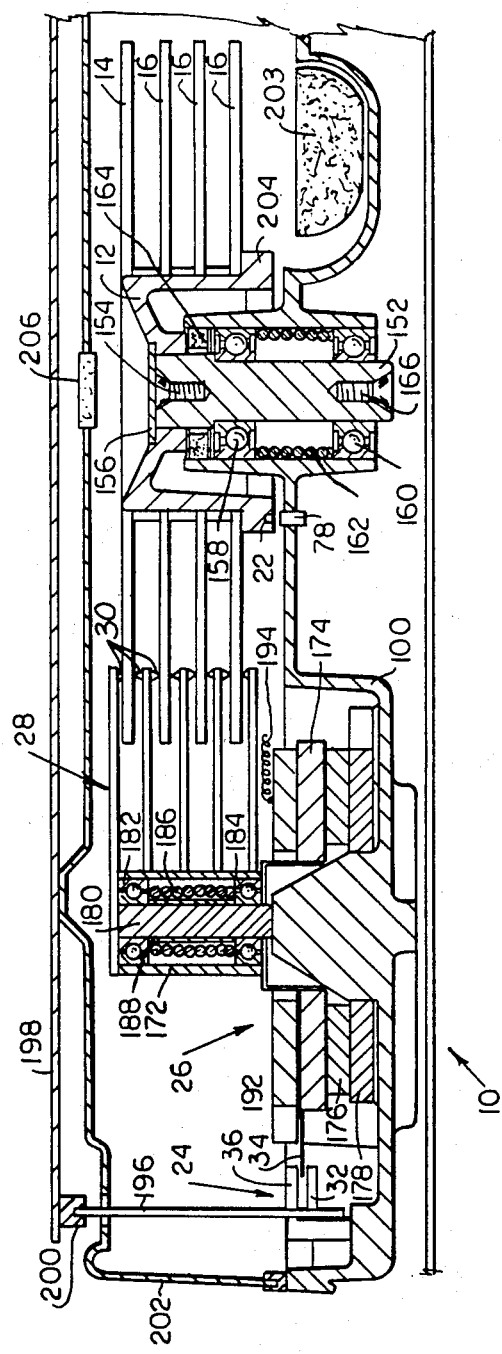
FIG. 1 is a somewhat diagrammatic view in side elevation and vertical section of a disk drive and head carriage assembly including a rotary actuator in accordance with the principles of the present invention.
Figure 4:
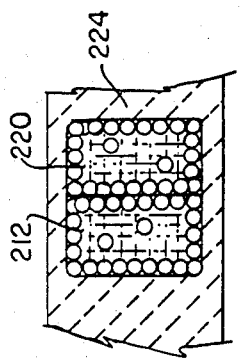
FIG. 4 is a view in side elevation and section of a portion of the wirewound rotor depicted in FIG. 3 taken along the line 4—4 in FIG. 2.

A rigid rotating disk memory system 10 is depicted structurally in FIG. 1. Therein, a drive hub 12 supports four disks: a top servo surface disk 14 and three lower disks 16. A multiplicity of concentric data tracks t, e.g. 512 tracks, are formed on each data surface of the disks 14, 16. The hub 12 is rotated by a motor via a drive belt not shown.

A rotary actuator 26, in accordance with the present invention, is depicted in FIGS. 1, 2, 3, 4 and 5. In the FIG. 1 vertical cross section, the actuator 26 includes a hub 172 to which a data transducer carriage 28 is mounted.

The disk drive 10 includes a base casting 100 providing a suitable frame for supporting the actuator 26. An optical encoder assembly 24, including a fixed light source 32, a scale 34 mounted to the actuator and a reticle-masked photodetector array 36 provides analog coarse track position information for positioning the head carriage assembly 28. An index marker 22 is provided in a lower outer flange of the spindle 12, and an index marker sensor 78 is secured proximately to the marker 22 through the frame 100.

The spindle 12 is mounted to a spindle shaft 152 by a screw 154 and a washer 156. Ball bearing assemblies 158, 160 are placed in a cylindrical portion of the frame 100 and are held in a spaced apart configuration by a spring 162. A magnetic fluid seal 164 is placed above the bearing 158 and seals the bearings by magnetic cohesion of the sealing fluid. A bottom screw 166 secures a pulley to the shaft 152 for the drive belt from the motor, not illustrated.

Figure 2:
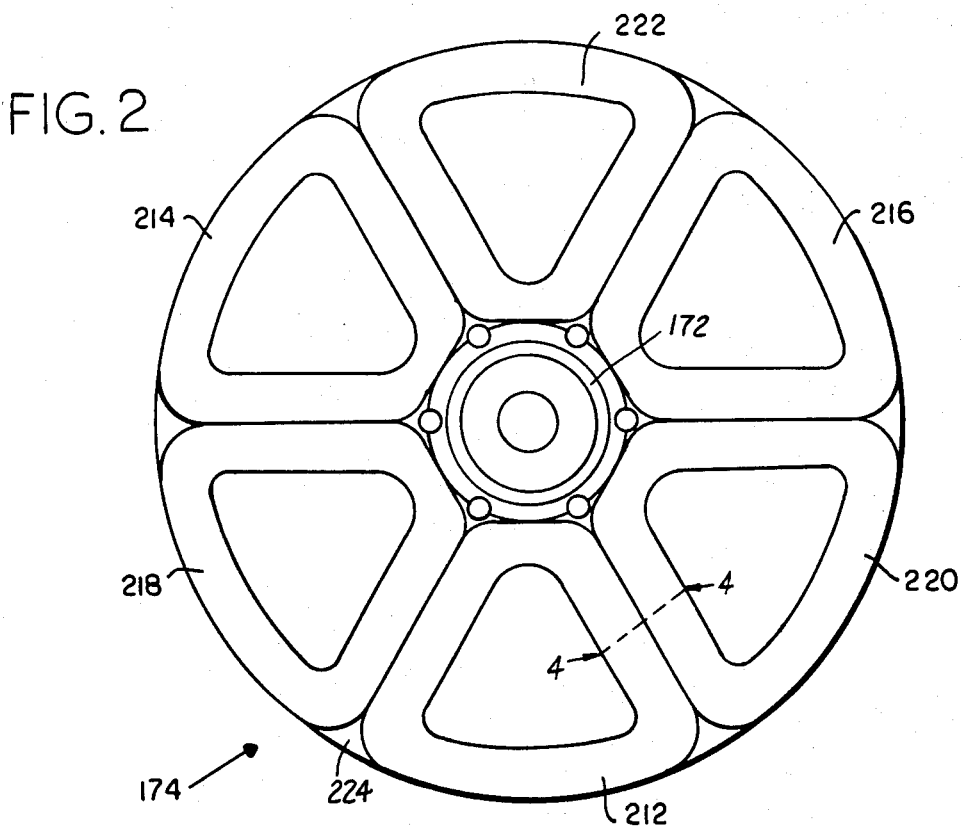
FIG. 2 is a top plan view of the hexagonal wirewound rotor of the rotary actuator assembly depicted in FIG. 1.
Figure 3:
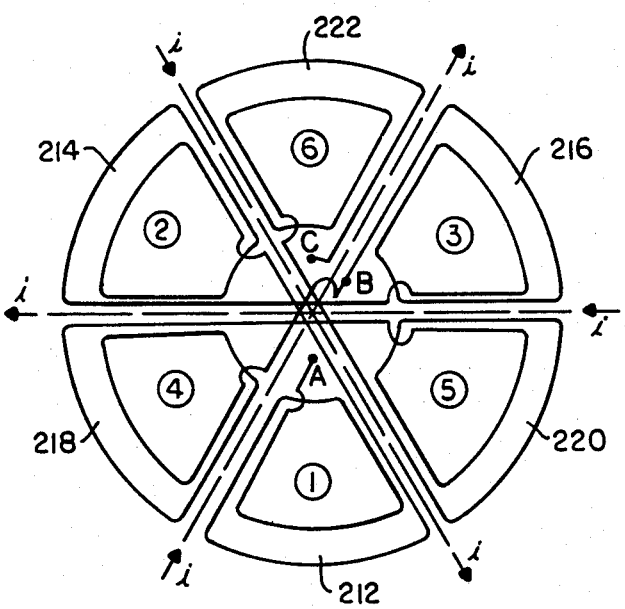
FIG. 3 is a schematic wiring diagram of the wirewound rotor of the rotary actuator assembly depicted in FIG. 1.

Other elements depicted in FIG. 1 include a printed circuit board 196 which carries the circuitry immediately associated with the optical encoder assembly 24 and also the wiring connection for the head 30. A main printed circuit board 198 carrying the rest of the circuitry required for the disk drive 10 is plugged into the board 196 at a plug 200. A plastic case 202 mates with the base 100 and provides an airtight seal throughout which is required for the reliable operation of flying head Winchester drive technology. An air filter 203 fits into a recess of the frame, and fins 204 extending from the flange at the base of the spindle 12 force air within the plastic enclosure to pass through the filter. A breather filter 206 enables internal and external pressures to equalize. A flat coil assembly 174 is secured by a bonding means such as adhesive to the base of the hub 172. Immediately below the coil assembly 174 is a ferroceramic permanent magnet 176 which is fabricated as a unitary structure and then magnetized into a series of adjacent even-number opposed field magnetic segments in which the north and south poles alternate at the top and bottom of the magnet 176. The number of separate segments in the magnet 176 corresponds to the number of coil windings in the coil assembly 174. As shown in FIGS. 2 and 3 there are e.g. six coil windings, as there are e.g. six separate magnetic segments in the magnet 176. An annular flux return plate 178 of low carbon steel forms a base for the magnet 176.

In fabrication, a ceramic blank is glued to the base plate 178 and then the resultant structure is permanently magnetized. A fixed shaft 180 extends from a ribbed portion of the frame 100. The hub 172 is journaled to the shaft 180 by ball bearing assemblies 182 and 184 which are initially held in place during fabrication by an axial preload spring 186 and spacer 188, with adhesive locking the bearings 182, 184 to the hub 172.

A flux return top plate 192 is secured to the frame 100. A bias spring 194 extends from a standoff on the top plate 192 to the data transducer carriage 28 and biases it to return to the inner landing zone of the disks when power is removed from the rotor 26. Crash stops may be formed in the top plate 192 to limit range of data transducer travel.

To develop balanced torque or what we call "pure torque", which minimizes loading of bearings 182, 184, and enables very inexpensive bearings to be utilized, we have developed a coil assembly 174 comprising six separate coil windings 212, 214, 216, 218, 220, and 222, each of which is generally triangular as shown in the FIG. 2 plan view, and all of which may be wound from a single continuous wire strand, as shown schematically in FIG. 3. Three coils 212, 214, and 216 are series connected together per the FIG. 3 schematic (A to B), while the other three coils 218, 220 and 222 are series connected together (B to C) in opposite phase relative to the first three coils.

It will be appreciated that the actuator 26 must rotate in both directions. Use of two sets of opposed geometrically symmetrical coils enables this movement through a simple electronic switching of the power supply from one winding set to the other.

Each coil segment may be wound upon a generally triangular bobbin, the three connections A, B, C, established and then leads connected and extending to the outside. Each segment, in cross section (FIG. 4) is approximately nine turns across by 22 turns high, of 29 gauge copper wire. The coil assembly 174 is then placed in a forming mold, and an epoxy potting compound 224 is then placed and pressed into the mold to form the assembly 174 (FIG. 2).

Adhesive is used to bind the coil assembly 174 to the hub 172. By utilizing potting compound 224 to form the assembly 174, a very high mechanical resonant frequency is achieved, and the assembly 174 dampens resonant vibration otherwise occuring in the head structure 28, thereby increasing the mechanical bandwidth of the coarse servo loop.

The coil assembly 174 is configured so that adjacent coil windings will produce equal and opposite forces resulting in a pure torque evenly applied about the axis of rotation of the actuator 26. If equal currents are present in both sides of the coil assembly 174 (A to B and C to B) these forces cancel, and there is no resultant torque produced. During seeking, in the event of any position error or disturbance occuring while the system 10 is operating in the closed loop track following or slewing modes, the currents in the windings become imbalanced, and this condition yields a restoring torque which moves the transducer assembly 26 until a position yielding equilibrium in current flow is again reached.

Figure 5:
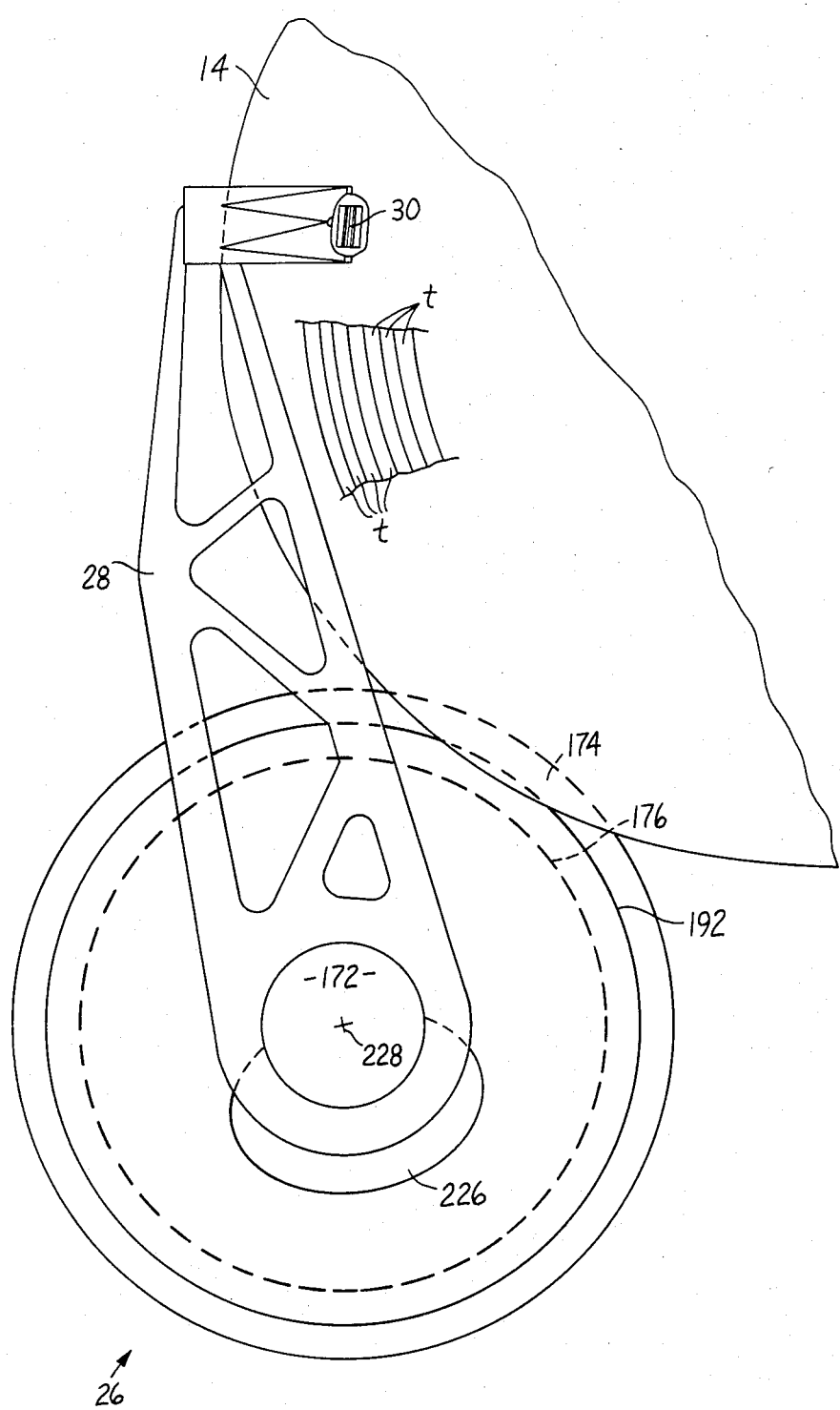
FIG. 5 is a diagrammatic plan view of the rotary actuator showing a data transducer and a counterweight mounted thereto.

Counterweights 226, FIG. 5, are added to the rotor hub 172 to place the center of mass of the head structure 28 in alignment with the axis of rotation 228 of the actuator 26. In this way, no unbalanced forces pass through the rotor bearings 182 and 184 as the actuator rotates about its axis.

Having thus described an embodiment of the invention, it will now be appreciated that the objects of the invention have been fully achieved, and it will be understood by those skilled in the art that many changes in construction and circuitry and widely differing embodiments and applications of the invention will suggest themselves without departure from the spirit and scope of the invention. The disclosures and the description herein are purely illustrative and are not intended to be in any sense limiting.

We claim:

1. A brushless, bidirectional, pure torque generating, electromechanical rotary actuator for random access, rapid positioning, along an arc of less than 90 degrees of a data transducer assembly among preselected ones of concentric data tracks of a rotating data storage disk, said actuator comprising:
   a base plate,
   a lower flux return plate secured to said base plate,
   permanent magnet means secured to said lower flux return plate for providing an even number plurality of adjacently opposed field magnetic field segments in which the north and south poles alternate at the major surfaces thereof, a stationary shaft connected to said base plate and extending vertically perpendicular to said base plate through the center of said lower flux return plate and said permanent magnet means, a hub rotatably mounted to said shaft, a coil assembly secured to said rotatable hub and closely spaced from said permanent magnet means, said coil assembly containing the same even number plurality of coils as there are magnet segments in said permanent magnet means, said coils being aligned adjacent to said magnetic segments at at least one position of rotation of said assembly, said coils being connected into two series of opposed windings equidistantly and symmetrically located about said assembly, an upper flux return plate secured to said base plate parallel to said permanent magnet means defining therebetween an annular space for said coil assembly and closely spaced to said coil assembly, a data transducer carriage connected to said hub and having a data transducer secured to its distal end, and a counterweight secured to said hub on the opposite side of said data transducer carriage to balance the weight thereof, whereby energizing said coils causes pure torque to be applied to said hub rotating said rotor arm and positioning said data transducer relative to said rotating data storage disk.

2. The electromechanical rotary actuator set forth in claim 1 wherein said coil assembly has been rotationally aligned relative to said permanent magnet means to linearize torque amplitude over the range of said arc.

3. The electromechanical rotary actuator set forth in claim 1 wherein said upper and lower flux return plates and said permanent magnet means are generally annular and wherein each said coil is formed of a generally triangular shape and wherein said coils are adjacent to each other within said rotatable coil assembly to form an annular coil plate assembly.

4. The electromechanical rotary actuator set forth in claim 3 wherein said assembly comprises coils connected into two sets, a first set comprising at least three non-adjacent coils connected in series in a first phase, and a second set comprising at least three non-adjacent coils connected in series in a second phase opposite to said first phase.

5. The electromechanical rotary actuator set forth in claim 4 wherein said first set and said second set have one common electrical connection which defines said first phase and said second phase.

6. The electromechanical rotary actuator set forth in claim 5 wherein said coils are formed of a single continuous wire strand.

7. The electromechanical rotary actuator set forth in claim 3 wherein said coil assembly comprises a molded disk containing said even number plurality of coils.

* * * * *